Dec. 5, 1939.  B. E. WILLIAMS ET AL  2,182,190

MEAT WRAPPING METHOD

Filed Aug. 24, 1938

ATTEST-
Wm C. Meiser

Beverly E. Williams
and Leon L. Cadwell
INVENTOR

BY
ATTORNEY

Patented Dec. 5, 1939

2,182,190

UNITED STATES PATENT OFFICE 2,182,190

MEAT WRAPPING METHOD

Beverly E. Williams and Leon L. Cadwell, Chicago, Ill., assignors to Swift and Company, Chicago, Ill., a corporation of Illinois Application August 24, 1938, Serial No. 226,570

5 Claims. (Cl. 99—174)

This invention relates to a meat wrapping method which is effective in protecting fresh meat and preserving its appearance.

One of the purposes of the invention is to provide a method for wrapping edible carcasses and wholesale cuts of meat in a manner to prevent shrinkage and preserve color.

The method of carrying out the invention will be apparent by reference to the drawing in which Figure 1 is a perspective view of a veal carcass covered with a tightly adherent paper wrapping.

Figure 1:
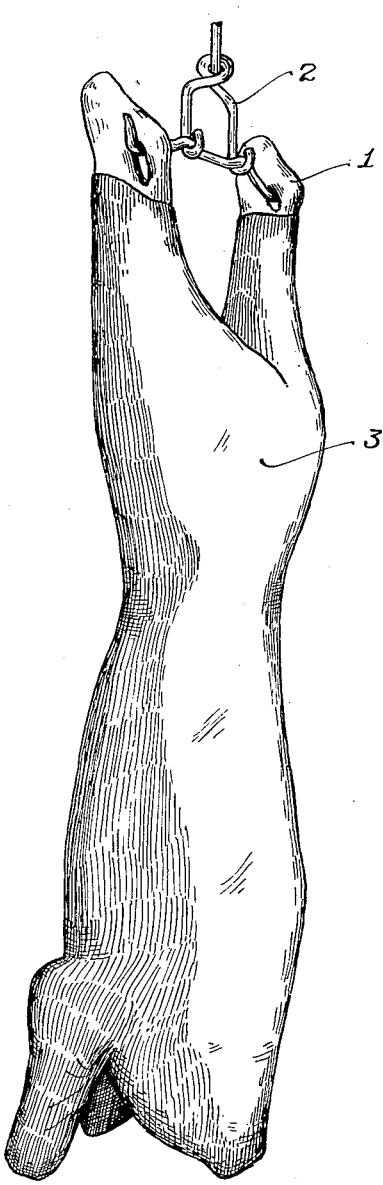
Figure 2:
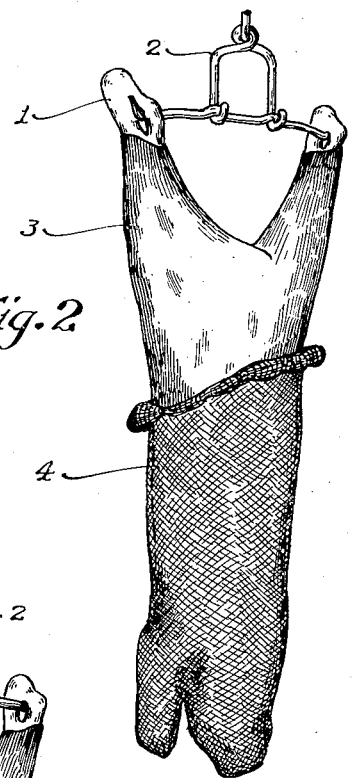
Figure 2 is a view of the carcass shown in Figure 1 partially covered with stockinette.
Figure 3:
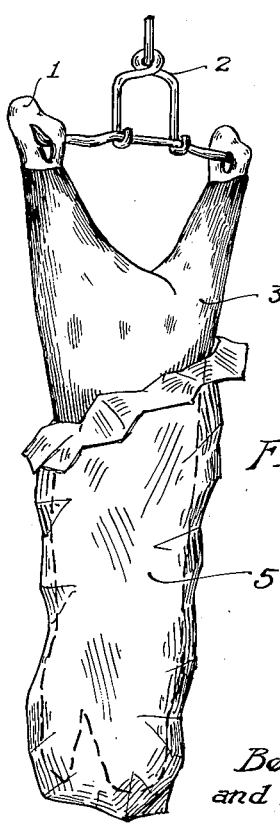
Figure 3 is a view of the carcass shown in Figure 1 partially covered with a crepe paper bag.

In carrying out the present invention a carcass or wholesalt cut of meat is first tightly wrapped in a tough wrapping paper which has been soaked in brine. The manner of wrapping is clearly shown in the drawing in which the veal carcass 1 suspended from hook 2 is shown in Figure 1 to be covered with a tightly adherent paper wrapper 3. In Figure 2 the wrapper is shown partially covered with stockinette 4. In Figure 3 the wrapper is shown partially covered with crepe paper bagging 5.

It has been proposed to wrap edible carcasses and wholesale portions thereof in paper of various types. Some papers are adversely affected by the meat juices and readily break down. Other papers are strong, relatively resistant to moisture, and provide some protection to the meat. However, in conventional methods of wrapping, the dry paper often becomes adherent to the meat, and the application of the dry paper adversely affects the color and general appearance of the meat.

In our prior Patent No. 2,076,053 entitled Treatment of calves, we disclose a method of wrapping veal carcasses and wholesale portions thereof in which a brine soaked cloth is placed in contact with the surface.

The present invention involves the use of moist paper in intimate contact with the meat surface. We prefer to employ paper which has been soaked in a brine solution of common salt, 20 degrees Baumé being satisfactory. We have found that the moist paper covering protected with an outer wrapping of cloth or a crepe paper bag provides an effective shield against shrinkage of the meat by evaporation. The presence of brine inhibits bacterial growth without curing the surface of the meat, with the result that meat such as veal, beef, lamb, and the like may be kept under refrigeration during storage and shipment without surface dehydration and without the adverse changes in color which occur when meat is wrapped in dry paper, whether water resistant, water repellent, or otherwise.

We claim:
1. The method of treating edible animal carcasses or wholesale portions thereof which comprises covering the surface of the meat with moist paper and thereafter enclosing the moist paper covered meat in an outer wrapping.
2. The method of treating edible animal carcasses or wholesale portions thereof which comprises applying brine moistened paper to the surface of the meat and thereafter enclosing the brine moistened paper covered meat in an outer wrapping.
3. The method of treating edible animal carcasses or wholesale portions thereof which comprises applying brine moistened paper to the surface of the meat and thereafter enclosing the brine moistened paper covered meat in a paper bag.
4. The method of treating edible animal carcasses or wholesale portions thereof which comprises applying brine moistened paper to the surface of the meat and thereafter enclosing the brine moistened paper covered meat in a crepe paper bag.
5. The method of treating edible animal carcasses or wholesale portions thereof which comprises applying brine moistened paper to the surface of the meat and thereafter enclosing the brine moistened paper covered meat in a cloth wrapper.

BEVERLY E. WILLIAMS.
LEON L. CADWELL.